US007167446B2

(12) United States Patent
Itoh

(10) Patent No.: US 7,167,446 B2
(45) Date of Patent: Jan. 23, 2007

(54) METHOD FOR TRANSFERRING QUALITY DECLARATION DATA IN AN ATM NETWORK

(75) Inventor: Jun Itoh, Yokohama (JP)

(73) Assignee: Fujitsu Limited, Kawasaki (JP)

(*) Notice: Subject to any disclaimer, the term of this patent is extended or adjusted under 35 U.S.C. 154(b) by 699 days.

(21) Appl. No.: 09/815,609

(22) Filed: Mar. 23, 2001

(65) Prior Publication Data
US 2001/0050919 A1    Dec. 13, 2001

Related U.S. Application Data

(63) Continuation of application No. PCT/JP98/04315, filed on Sep. 25, 1998.

(51) Int. Cl.
*G06F 11/00* (2006.01)

(52) U.S. Cl. .................. 370/230; 370/236; 370/395.21

(58) Field of Classification Search ................ 370/229, 370/230, 236, 236.1, 395.1, 395.3, 428, 467
See application file for complete search history.

(56) References Cited

U.S. PATENT DOCUMENTS

| 5,519,689 | A  | * | 5/1996  | Kim ............................ 370/232 |
| 6,266,701 | B1 | * | 7/2001  | Sridhar et al. ............... 709/232 |
| 6,285,659 | B1 | * | 9/2001  | Feuerstraeter et al. ...... 370/244 |
| 2002/0176442 | A1 | * | 11/2002 | Favichia et al. ............ 370/465 |

FOREIGN PATENT DOCUMENTS

JP    3-283849    12/1991
JP    7-170274    7/1995

OTHER PUBLICATIONS

Kinzaburo Yoshie et al., "A Study of Addition of New Protocol of Packet Switched Network (in Japanese)", 1983 General Meeting of the Institute of Electronics and Communication Engineers of Japan, Mar. 5, 1983, The Institute of Electronics and Communication Engineers of Japan 1710.

Takaaki Fukuda et al., "Method of Constructing File when New Service is added in Packet Exchange (in Japanese)", 1986 General Meeting of the Institute of Electronics and Communication Engineers of Japan, Mar. 5, 1986, The Institute of Electronics and Communication Engineers of Japan 1965.

(Continued)

*Primary Examiner*—Chau Nguyen
*Assistant Examiner*—Christopher Grey
(74) *Attorney, Agent, or Firm*—Katten Muchin Rosenman LLP

(57) ABSTRACT

In an ATM switched network having an ATM switching system which accommodates originating and terminating subscribers, a method and equipment is disclosed to solve a problem produced when connecting between communication equipment according to protocols because of the differences of protocol versions applied within the network. To transit quality declaration data in a ATM network, the ATM switching system therein includes the steps of determining QoS (quality of service) correction principle for adjusting the differences between subscriber protocols respectively supporting an originating subscriber and a terminating subscriber, generating quality control information using the QoS correction principle, performing connection admission control and usage parameter control based on generated quality control information, and transmitting quality control information to the terminating subscriber.

6 Claims, 9 Drawing Sheets

OTHER PUBLICATIONS

Takumi Oba et al., "Trend and Problem of Standardization of ATM Network Signal System (in Japanese)", IEICE Technical Report; Aug. 20, 1996, IEICE SSE96-58.

Mitsufumi Yotsumiya et al., "Problem to be Studied of Quality of B-ISDN and Trend of Standardization (in Japanese)", The Transaction of IEICE, vol. J-80-B-I, No. 6, Jun. 25, 1997, IEICE, p. 305-312.

Mitsufumi Yotsumiya et al., "Problem to be Studied of Quality of Service of B-ISwDN and Trend of Standardization (in Japanese)", NTT R&D vol. 47 No. 2, Feb. 10, 1998, p. 183-193, The Telecommunications Association.

UNIX Magazine (11.97), p. 25-38, Network Technology 2 Yoichi Haguchi, ATM: UNI Signaling (in Japanese).

* cited by examiner

METHOD FOR TRANSFERRING QUALITY DECLARATION DATA IN AN ATM NETWORK

This is a request for filing a continuation application under 37 CFR 1.53(b) of pending prior international application Number PCTJP 98/04315, filed on Sep. 25, 1998 entitled Method for Transferring Quality Declaration Data in an ATM Network which designated the United States.

BACKGROUND OF THE INVENTION

1. Field of the Invention

The present invention relates to a method for transferring quality declaration data in an ATM (asynchronous transfer mode) network.

2. Related Arts

In recent years, multimedia services have been making rapid progress, and accordingly demands for an ATM switching and system are increasing. ATM technology enables efficient transmission of multimedia information in high speed with a guaranteed communication quality for information contents.

Quality control is attained in the following manner in case of SVC (switched virtual connection)—a switching method of selecting channel to the destination and setting up connection thereto. When setting up a connection, an originating user declares a desired communication quality to an ATM switching. There are provided a quality control principle and a procedure for declaring quality control information standardized by ITU-T (International Telecommunication Union's Telecommunication Standardization Sector) or other organizations such as the ATM forum for establishing necessary recommendations. Through this procedure, quality control according to declared contents is realized.

Efforts for standardization conducted by the above organizations started in 1993. Since then, a lot of works have been brought about to improve the recommendations in various points. Such improvement is triggered by increased variety of multimedia services and expanded use of ATM switching technology. Quality control technology itself has also been improved.

As a result, the recommendations have changed to supplement the initial recommendation and, in addition, new recommendations have been established. Accordingly, the contents have greatly been modified from the initial recommendation.

This tendency is remarkable especially in quality control issues which act as one of the major roles among ATM technologies. Although the situation surrounding ATM has been changed as described above, most equipment for ATM control used today respectively for data originating point, data terminating point and data transfer equipment is based on the initial recommendation.

From now on, it is expected that the market will further expand by implementing up-to-date control method based on new recommendations to achieve more efficient transmission, as well as by introducing refined QoS (quality of service) control corresponding to each transmission contents.

Improvement of quality control incorporated in the related recommendations has aimed at the same target of quality control principle. However, actual approaches to the targeted control principle are different, and at present the improvement of control principle succeeds these differences. Under such circumstances, variations in these recommendations as well as the versions established for supporting data originating point, for receiving point and for ATM network become more and more apparent.

It is not desirable if the above phenomenon brings about impeding the uniformity of communication quality for end-to-end connection (connection between user terminals) of data transmission.

The current versions of the established recommendations and the differences thereof are summarized below. Also, problems which may occur at the time of establishing connections are pointed out.

Recommendation (1): ITU-T SCS1—specifying QoS=0 only.

A user cannot designate specific quality requirement. The quality accords to the quality determined by the ATM switching based on the declaration data of traffic information and bearer information, which is not the declaration of QoS (quality of service).

Recommendation (2): ITU-T SCS2—specifying QoS=1 to 4.

With this Recommendation, specific QoS control becomes possible by a user. When QoS=0 is declared, the control same as the recommendation (1) is carried out. When either of QoS=1 to 4 is declared, quality of service is specified based on the declared QoS information.

Recommendation (3): ATM forum V3.1 IISP (Interim Inter-Switch Signaling Protocol)—specifying QoS=0, 1 to 3.

The control same as the recommendation (1) is carried out irrespective of QoS value. However, the declared QoS is treated as auxiliary information. Further, the declaration of auxiliary information is specified to realize traffic quality expected when QoS=0. When traffic type UBR is desired, "best-effort" indication is added in traffic declaration data of QoS=0. Recommendation (4): ATM forum V4.0—specifying QoS=0, 1 to 3.

In addition to the recommendation (3), it is possible to declare extended quality control information. It is intended to bring out the capability of ATM switching in case of traffic other than UBR (unspecified bit rate) or ABR (available bit rate). Also the ABR case is specified as well as UBR. When traffic type ABR is desired, the declaration of QoS=0 is mandatory.

As may be appreciated by the above description, different contents are specified by the various recommendations. This causes the following problems which result in impediments to interwork communications between users where different recommendations and/or versions are applied respectively.

(a) Difference between the recommendations of subscriber support protocol and/or the versions.

When the different recommendations and/or versions are used for subscribers accommodated in an ATM switching for their respective purposes, there may be a case that QoS indication does not coincide each other. For this reason, when originated information is transferred to a destination user without modification, connection setup request may be rejected because the declaration is treated as undefined or is unsupported, thus the interworking is impeded.

The interworking between the recommendations and versions explained above is summarized in the following table.

| Interworking relations | Occurrence of impediment | Interworking relations | Occurrence of impediment |
|---|---|---|---|
| (1) → (2) | ○ | (3) → (1) | Δ4 |
| → (3) | ○ | → (2) | Δ5 |
| → (4) | ○ | → (4) | ○ |
| (2) → (1) | Δ1 | (4) → (1) | Δ6 |
| → (3) | Δ2 | → (2) | Δ7 |
| → (4) | Δ3 | → (3) | Δ8 |

Explanatory notes:
○: No impediment occurs.
Δ: Impediment occurs partially.
Δ1: QoS declaration is not permitted, except QoS = 0.
Δ2: Declaration of QoS = 4 is not permitted.
Δ3: Special condition exists (as shown in (2) and (3) below.)
Δ4: Declaration is not permitted, except QoS = 0.
Δ5: Special condition exists (as shown in (2) below.)
Δ6: Declaration is not permitted, except QoS = 0. Also, declaration of extended information is not permitted.
Δ7: Declaration of extended information is not permitted.
Δ8: Declaration of QoS = 4 is not permitted. Also declaration of extended information is not permitted.

(b) Different control in spite of identical QoS declaration value specified.
  As shown below, even when the identical QoS value is declared, the permitted traffic types are different, resulting in the impediment of interworking.
  QoS=4 in the above recommendation (2) corresponds to the traffic type UBR, while
  QoS=4 in the above recommendation (4) corresponds to the traffic type nrt-VBR (non-real-time variable bit rate).
  Therefore, it is not possible to inform QoS information between subscribers respectively supporting the above two recommendations, so far as the original value is transmitted.
(c) Different QoS value declaration on desired traffic type.
  As explained below, permitted QoS values differ depending on desired traffic types, which impedes interworking.
    1) To desire traffic type UBR, QoS=4 is specified to declare in case of the recommendation (2) on the other hand, QoS=0 is specified and additionally best-effort information is attached thereto in case of either the recommendations (3) or (4).
    2) To desire traffic type ABR, QoS=3 or 4 is specified to declare in case of the recommendation (2), while QoS=0 is specified in case of the recommendation (4).
(d) Difference on receivable QoS information, producing failure to transfer necessary information.
  When a detailed request other than QoS is issued based on the extended quality control information specified by the ATM forum V4.0, there may be a case that the above request information cannot be transferred to a destination user accommodated in an ATM switching, in the case the communication protocol does not conform to the recommendation or version in which the aforementioned information is supported. Moreover, the declaration of QoS is not necessary when the extended information is declared. This further impedes interworking.
(e) Accurate information exchange not possible even between ATM switchings, especially in the case of interchange between the ATM switchings manufactured by different manufactures.

For example, there may be a case that the declaration QoS=0 is unconditionally controlled as a UBR traffic. Therefore, even QoS=0 is declared, uniform quality control is not always provided through an end-to-end connection.

SUMMARY OF THE INVENTION

Accordingly, it is an object of the present invention to provide a means for transferring quality declaration data in an ATM network to cope with the aforementioned problems when connecting between the communication equipment according to the protocol, such problems being caused by the difference of implemented protocol versions applied between communication equipment.

According to the invention, a method for transferring quality information in the ATM switched network, which is provided with ATM switchings having an originating subscriber and a terminating subscriber, includes the steps of;

obtaining a QoS (quality of service) correction principle for correcting the difference between a subscriber signaling protocol which supports the originating subscriber and a subscriber signaling protocol which supports the terminating subscriber respectively accommodated in an ATM switching;

generating quality control information corrected by the QoS correction principle;

performing connection admission control and usage parameter control according to the generated quality control information; and transmitting the quality control information to the terminating subscriber.

One aspect of the invention is that the aforementioned QoS (quality of service) correction principle is determined from a plurality of combinations constituted by originating subscribers and terminating subscribers with respect to the predetermined versions of subscriber signaling protocols.

As another aspect of the invention, an ATM switched network having; a first ATM switching; an originating subscriber accommodated in the first ATM switching; a second ATM switching; and a terminating subscriber accommodated in the second ATM switching, wherein said ATM switched network includes:

in said first ATM switching, a mapping function for mapping declaration data in a subscriber signaling protocol conforming to the subscriber signaling protocol which supports the originating subscriber requesting a connection setup, to information conforming to a standard of an interoffice signaling protocol; and in the second ATM switching, a mapping function for mapping declaration data in the interoffice signaling protocol to the information conforming to a standard of a subscriber signaling protocol which supports the terminating subscriber, wherein the ATM switching used for transferring the aforementioned quality declaration data in ATM switched network includes;

a subscriber signaling protocol database for accommodating an originating subscriber and a terminating subscriber, and for storing subscriber signaling protocols which respectively support subscribers corresponding to each subscriber number of the originating subscriber and the terminating subscriber; and a database of correction contents management information which stores quality of service correction principle corresponding to a combination of a subscriber signaling protocol which supports the originating subscriber and a subscriber signaling protocol which supports the terminating subscriber respectively accommodated in the subscriber signaling protocol database. The ATM switching includes the functions of;

generating quality control information corrected by means of the aforementioned QoS correction principle;

performing connection admission control and usage parameter control, according to the generated quality control information; and transmitting the quality control information to the terminating subscriber.

Further objects and features of the present invention will become more apparent from the description of the embodiments of the invention referring to the accompanied charts and drawings.

DESCRIPTION OF THE EMBODIMENTS OF THE INVENTION

The embodiments of the present invention are described hereafter according to the accompanied charts and drawings.

Prior to the explanation of the invention, the conventional configuration is illustrated for the sake of better understanding of the present invention.

Figure 1:
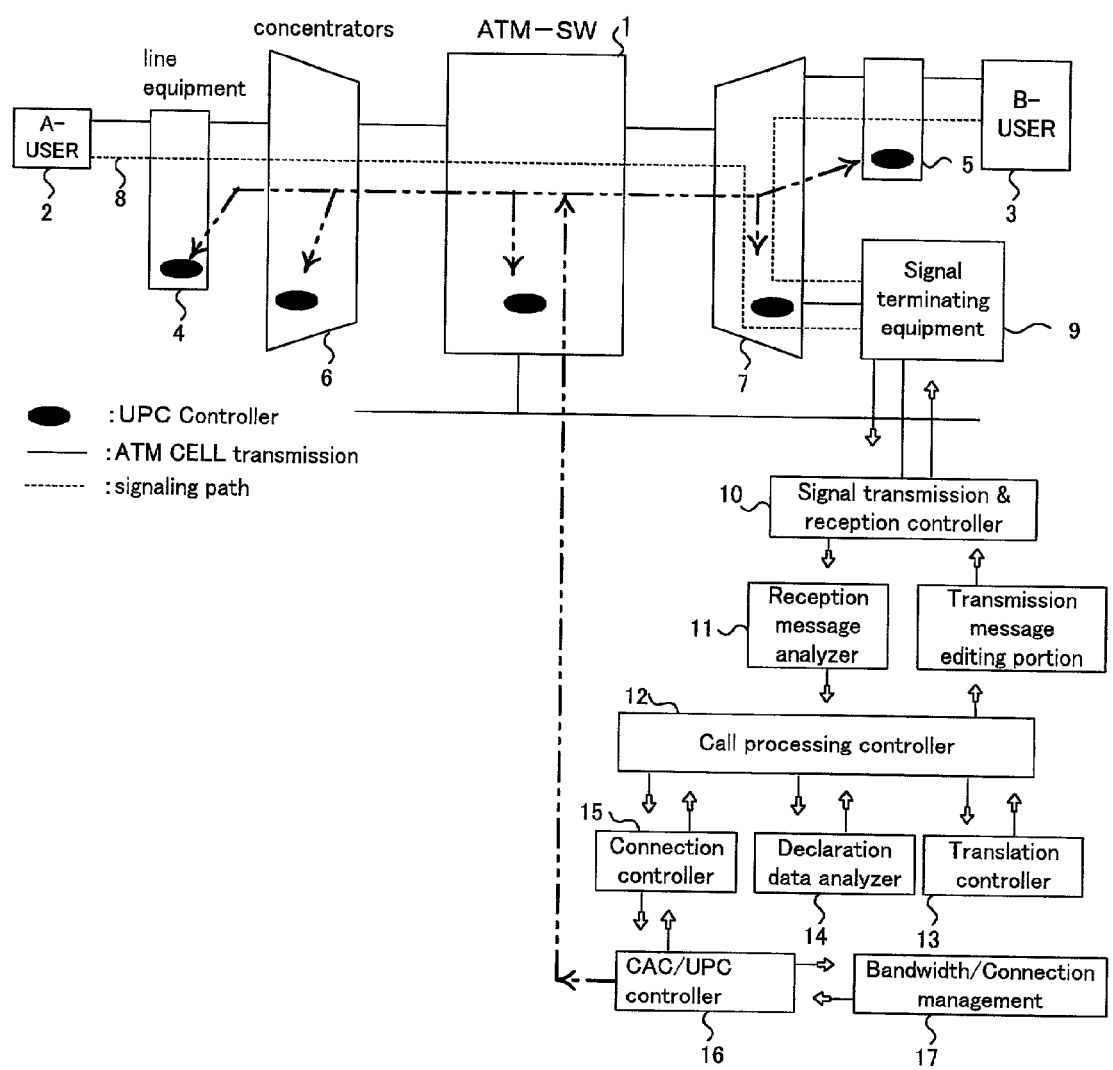
FIG. 1 shows a diagram of general configuration of an ATM switching.

In FIG. 1, there is shown a general configuration of an ATM switching. An ATM switch 1 is provided as core equipment of a network. In FIG. 1, a user-A 2 and another user-B 3 are connected to ATM switch 1, respectively through line equipment 4 and 5, and concentrators 6 and 7.

When connecting user-A 2 with user-B 3 through ATM switch 1, a call setup signal transmitted from user-A 2 is received on signal terminating equipment 9 through a signaling path 8.

The received call setup signal branches from signal terminating equipment 9 to forward to a signal transmission & reception controller 10. Signal transmission & reception controller 10 analyzes at a reception message analyzer 11 call processing control information contained in the received control signal, to forward to a call processing controller 12.

Call processing controller 12 further forwards necessary control information to the corresponding a translation controller 13, a declaration data analyzer 14, and a connection controller 15.

Translation controller 13 receives address information to determine a cell connection route by ATM switch 1. Declaration data analyzer 14 determines necessary bandwidth from both declared traffic information and declared quality to set to the related hardware. Further, connection controller 15 exchanges the informed connection information with a CAC/UPC controller 16.

CAC/UPC controller 16 conducts functions of connection admission control (CAC) and usage parameter control (UPC) to the related portions in the aforementioned ATM switching, under the control of bandwidth/connection controller 15.

The connection admission control (CAC) controls whether or not a connection is admitted for the communication having a certain bandwidth from one point to another with a certain quality. Also, by means of the usage parameter control (UPC), the amount of user traffic is supervised. If the traffic amount exceeds a declared value, cell discarding etc. are carried out.

In FIG. 1, parts shown in black circles are objects for UPC control. In such a configuration of the ATM switching, as previously described, the aforementioned problems (a) to (e) arise when different protocol versions are applied, for example, to a subscriber(or user)-A 2 and a subscriber(or user)-B 3.

Here, it is possible to recognize the difference of quality control level by the adopted recommendation version number. Therefore, it is possible to avoid the aforementioned problems (a) to (e) by managing the versions of the recommendations for each subscriber accommodated in An ATM switching, to correct the differences of the recommendations.

Furthermore, in regard to interoffice signaling, a single type of signaling protocol is generally used for interoffice communication within a certain country. Therefore, to realize the correction of declaration, the most updated version of The ATM forum is used in North America, and also the most updated version of ITU-T Recommendation is used in Europe, Southeast Asia, and the Middle and Near East.

Accordingly, no matter which version of the recommendations is used to support subscribers in An ATM switching, a uniform quality control can be attained for the end-to-end connection bridged between switching offices.

Figure 2:
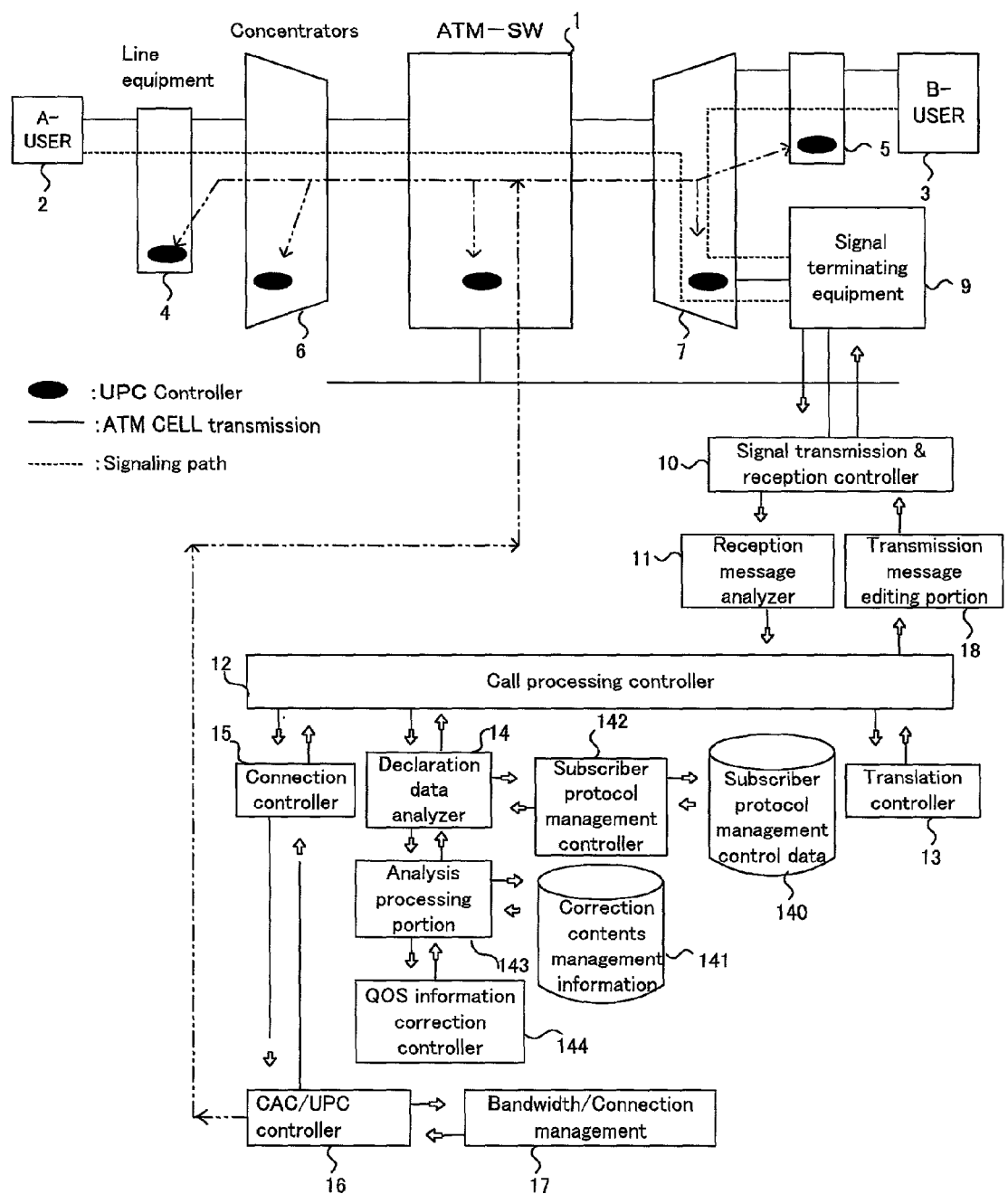
FIG. 2 shows an embodiment of an ATM switching according to the present invention.

As a feature of the present invention, the aforementioned control principle is utilized. In FIG. 2, there is shown a configuration example of An ATM switching according to the invention.

In the configuration example shown in FIG. 2, there is illustrated a connection of a subscriber(or user)-A to an ATM switch 1 and to a subscriber(or user)-B, where the subscribers A and B are respectively supported by mutually different protocols.

Compared to a conventional configuration shown in FIG. 1, the configuration shown in FIG. 2 provides databases of a subscriber protocol management control data 140 and correction contents management information 141, according to the present invention. As a means to use these databases in declaration data analyzer 14, a subscriber protocol management controller 142 and analysis processing portion 143 are provided.

Moreover, there is provided a correction control means 144 for the correction control based on the correction value of QoS information obtained in analysis processing portion 143.

Figure 3:
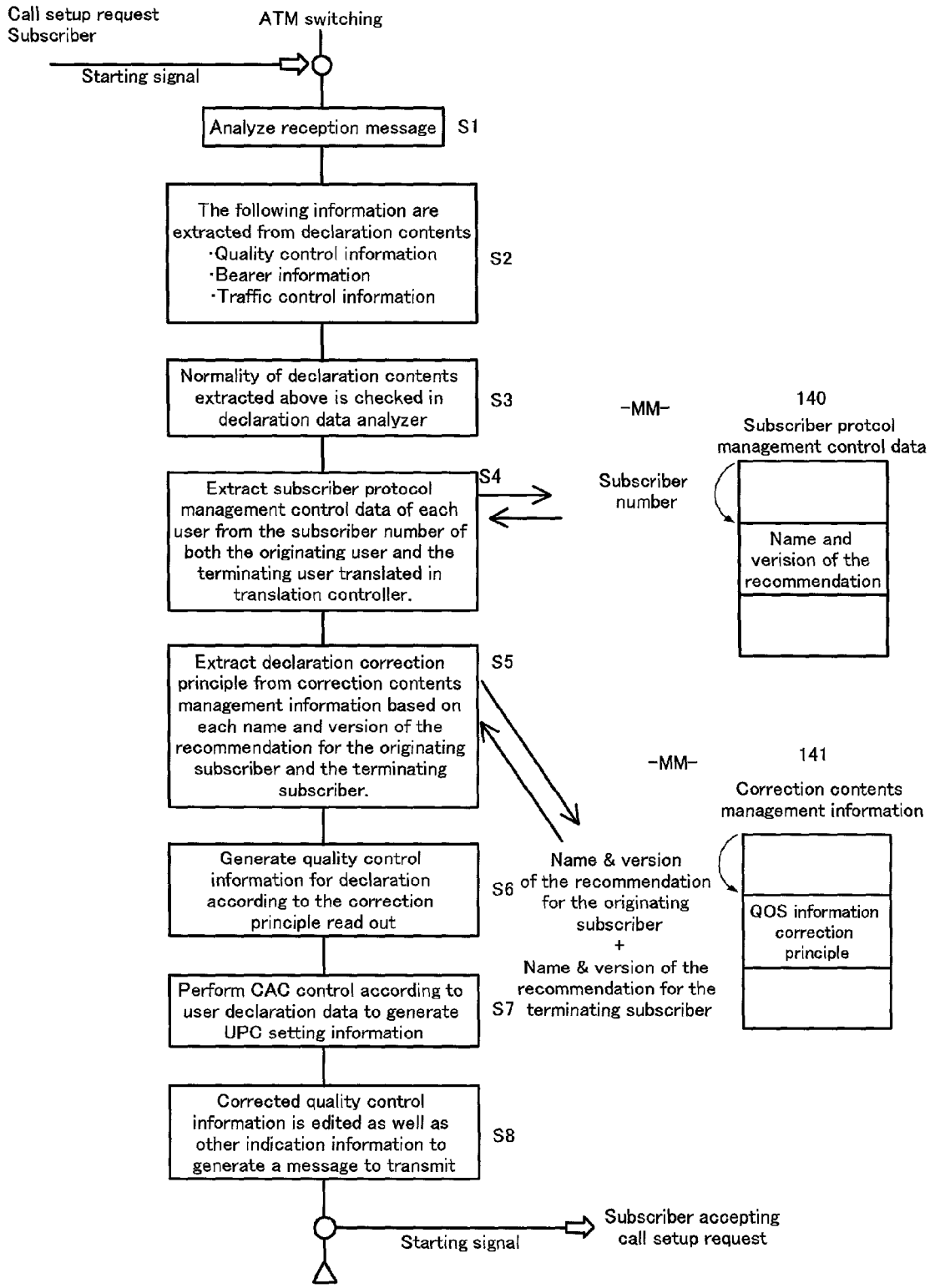
FIG. 3 shows an operation flowchart corresponding to the embodiment shown in FIG. 2.

In FIG. 3, there is shown an operation flowchart corresponding to the embodiment shown in FIG. 2. When the ATM switching receives a call setup request from user-A 2, the received message is analyzed by reception message analyzer 11 (step S1).

Then, quality control information, bearer information and traffic control information are extracted from declaration contents in the received message of the call setup signal (step S2). The normality of declaration contents extracted above is checked in declaration data analyzer 14 (step S3).

Declaration data analyzer 14 then extracts subscriber protocol management control data of each user from subscriber protocol management control data 140 through subscriber protocol management controller 142, based on the subscriber number of both the originating user and the terminating user respectively translated in translation controller 13 (step S4).

Here, in subscriber protocol management control data 140, the name and version of the recommendation for supporting the corresponding users are registered based on subscriber numbers in main memory MM. This enables to read out the name and version of the recommendations respectively for the originating subscriber and the terminating subscriber.

A database of correction contents management information 141 is retrieved based on each name and version of the recommendation for the originating subscriber and the terminating subscriber, and thus the corresponding QoS information correction principle is read out (step S5).

Database of correction contents management information 141 is also stored in main memory MM, in which correction principle for correcting the differences of the name and version of the recommendations is registered, corresponding to the combinations of the recommendation and the version thereof between supported equipment for connection. The detail of this correction principle is explained later.

A QoS information correction controller 144 generates quality control information for declaration according to the correction principle having been read out (step S6).

Then, CAC/UPC controller 16 performs CAC control according to user declaration data to generate UPC setting information (step S7). Also, the corrected quality control information is edited as well as other indication information by transmission message editing portion 18 to generate a message to transmit to a subscriber accepting call setup request, i.e. user-B 3 (step 8).

As described above, the difference of quality control level can be known using the version number of the recommendation. For this purpose, information representing which version of the recommendation each subscriber accommodated in the ATM switching conforms to is stored in main memory MM as subscriber protocol management control data 140.

Furthermore, the difference between the recommendations is stored in main memory MM as correction contents management information 141 corresponding to the combinations of connection.

In the embodiment shown in FIG. 2, according to the correction control information output from QoS information correction controller 144, CAC/UPC controller 16 corrects quality information against each UPC control object in the ATM switching to transmit to the terminating subscriber. This correction is carried out based on the following conversion principle:

(1a) In case the recommendation contents (1) are supported for the originating subscriber user-A. For the terminating subscriber user-B;
  if recommendation contents (1) are supported, then the received QoS information is transmitted without correction.
  if recommendation contents (2) are supported, then the received QoS information is transmitted without correction.
  if recommendation contents (3) are supported, then the received QoS information is transmitted without correction.
  if recommendation contents (4) are supported, then the received QoS information is transmitted without correction.

(1b) In case the recommendation contents (2) are supported for user-A. For user-B;
  if recommendation contents (1) are supported, then the received QoS=n (0 to 4) is converted into QoS=0 to transmit.
  if recommendation contents (2) are supported, then the received QoS information is transmitted without correction.
  if recommendation contents (3) are supported, and further if the received QoS=0 to 3, then this QoS value is transmitted without correction; else if the received QoS=4, then QoS is converted to 0 and best-effort indication is added to transmit.
  if recommendation contents (4) are supported, and further if the received QoS=0 to 3, then this QoS value is transmitted without correction; else if the received QoS=4, then QoS is converted to 0 and best-effort indication is added to transmit. Further, when traffic type ABR is declared, then the QoS is converted into QoS=0 to transmit.

(1c) In case the recommendation contents (3) are supported for user-A. For user-B;
  if recommendation contents (1) are supported, then the QoS=n (0 to 4) is converted into QoS=0 to transmit. Further, when traffic type UBR is declared, the best-effort indication having been added is used to transmit.
  if recommendation contents (2) are supported, and further if QoS=0 to 3 then the received QoS is transmitted without correction; else if QoS=4, then it is converted to QoS=3 to transmit. When traffic type UBR is declared, the added best-effort indication is discarded and converted into QoS=4 to transmit.
  if recommendation contents (3) are supported, then the received QoS information is transmitted without correction.
  if recommendation contents (4) are supported, then the received QoS information is transmitted without correction.

(1d) In case the recommendation contents (4) are supported for user-A. For user-B;
  if recommendation contents (1) are supported, then the QoS=n (0 to 4) is converted into QoS=0 to transmit. Further, when traffic type UBR is declared, the best-effort indication having been added is discarded to transmit.
  if recommendation contents (2) are supported, and further if the QoS=n (0 to 3), then the received QoS is transmitted without correction. Else if QoS=4, the QoS is converted into QoS=3 to transmit. Further, when traffic type UBR is declared, the best-effort indication having been added is discarded and converted into QoS=4 to transmit. In addition, when traffic type ABR is declared, QoS=2 or 3 is transmitted, referring to the declared traffic pattern.
  if recommendation contents (3) are supported, then the received QoS information is transmitted without correction, except that when QoS=4 is received the QoS is converted into QoS=3 to transmit.

if recommendation contents (4) are supported, then the received QoS information is transmitted without correction.

As described above, it becomes possible to avoid the aforementioned problems (a) to (c) where the difference of the recommendations and versions supported for each subscriber impedes the interworking.

Accordingly, even in case that quality information transmission produces inconsistency between subscribers accommodated in the ATM switching because those subscribers use mutually different recommendations and versions according to their own purposes, the quality information is corrected corresponding to the signaling protocol of a terminating subscriber. Also, a call setup request is processed properly and thus the interworking is realized without any problem.

Moreover, in the case that an ATM-PBX, an ATM-EDGE SW or the like exists further to the terminating subscriber 3 and that each of these ATM-PBX etc. possibly provides independent quality control function, there may be a case that it becomes difficult to maintain unified end-to-end connection quality.

Such a case as described above can be avoided by adopting the following method. The correction contents management information according to the correction principle shown in FIG. 2 is modified so that the second quality control information, which is obtained when the CAC control is carried out in the network based on the declaration data, can be transferred as shown below.

More specifically, as the second quality control information, the quality information to be transferred to a terminating subscriber is corrected according to a conversion principle shown below:

(2a) In case the recommendation contents (1) are supported for the originating subscriber user-A. For the terminating subscriber user-B;

if recommendation contents (1) are supported, then the received QoS information is transmitted without correction.

if recommendation contents (2) are supported, then QoS generated in the ATM switching for use of CAC control is transmitted.

if recommendation contents (3) are supported, then QoS internally generated in The ATM switching for use of CAC control is transmitted. Further, in case internally generated QoS=4, then QoS=0 and best-effort indication is added.

if recommendation contents (4) are supported, then QoS internally generated in The ATM switching for use of CAC control is transmitted. Further, in case internally generated QoS=4, then QoS=0 and best-effort indication is added.

(2b) In case the recommendation contents (2) are supported for user-A. For user-B;

if recommendation contents (1) are supported, then the received QoS=n (0 to 4) is converted into QoS=0 to transmit.

if recommendation contents (2) are supported, then the received QoS information is transmitted without correction.

if recommendation contents (3) are supported, and further if the received QoS=0 to 3, then this QoS value is transmitted without correction; else if the received QoS=4, then QoS=0 and best-effort indication is added to transmit.

if recommendation contents (4) are supported, and further if the received QoS=0 to 3, then this QoS value is transmitted without correction; else if the received QoS=4, then QoS=0 and best-effort indication is added to transmit. Further, when traffic type ABR is declared, then the QoS is converted into QoS=0 to transmit.

(2c) In case the recommendation contents (3) are supported for user-A. For user-B;

if recommendation contents (1) are supported, then the QoS=n (0 to 4) is converted into QoS=0 to transmit. Further, when traffic type UBR is declared, the best-effort indication having been added is discarded to transmit.

if recommendation contents (2) are supported, and further if QoS=0 to 3 then the received QoS is transmitted without correction, and when traffic type UBR is declared, the best-effort indication having been added is discarded and converted into QoS=4 to transmit.

if recommendation contents (3) are supported, then the received QoS information is transmitted without correction.

if recommendation contents (4) are supported, then the received QoS information is transmitted without correction.

(2d) In case the recommendation contents (4) are supported for user-A. For user-B;

if recommendation contents (1) are supported, then the QoS=n (0 to 4) is converted into QoS=0 to transmit. Further, when traffic type UBR is declared, the best-effort indication having been added is discarded to transmit.

if recommendation contents (2) are supported, and further if the QoS=n (0 to 3), then the received QoS is transmitted without correction. Else if QoS=4, QoS internally generated in The ATM switching for use of CAC control is transmitted. Further, when traffic type UBR is declared, the best-effort indication having been added is discarded and converted into QoS=4 to transmit. When traffic type ABR is declared, QoS=2 or 3 is transmitted, referring to the declared traffic pattern.

if recommendation contents (3) are supported, then the received QoS information is transmitted without correction, except that, when QoS=4 is received, the QoS internally generated in The ATM switching for use of CAC control is transmitted.

if recommendation contents (4) are supported, then the received QoS information is transmitted without correction.

In order to avoid the impediment which occurs in quality declaration using extended quality control information as previously mentioned in the problem (d), an improvement based on the following control principle against the second correction contents management information shown in the control principle of the embodiment in FIG. 2 is introduced to omit the impediment factor and to realize interworking.

Control Principle-1

When only extended quality information is declared, policing is carried out against interworking with signaling protocol not conforming to the recommendation contents (4).

Control Principle-2

When both quality control information and extended quality control information are declared, the interworking is carried out without policing mentioned above.

Moreover, as an embodiment example, the third correction contents management information which is improved considering above is shown below:

When both quality control information and extended quality control information are declared:

When the recommendation contents (4) are supported for the originating subscriber user-A, and the recommendation contents (1) are supported for the terminating subscriber user-B, the QoS=n (0 to 4) is converted into QoS=0 to transmit. Further, when traffic type UBR is declared, the best-effort indication having been added is discarded to transmit.

In case the recommendation contents (4) are supported for user-A, and the recommendation contents (2) are supported for user-B. In case QoS=0 to 3, then the received QoS is transmitted without correction. Else, in case QoS=4, QoS internally generated in The ATM switching for use of CAC control is transmitted. Further, when traffic type UBR is declared, the best-effort indication having been added is discarded and converted into QoS=4 to transmit. When traffic type ABR is declared, QoS=2 or 3 is transmitted, referring to the declared traffic pattern.

In case the recommendation contents (4) are supported for user-A, and the recommendation contents (3) are supported for user-B. In this case the received QoS information is transmitted without correction. Also, in case QoS=4, the QoS internally generated in The ATM switching for use of CAC control is transmitted.

In case the recommendation contents (4) are supported for user-A, and the recommendation contents (4) are supported for user-B. In this case, the received QoS information is transmitted without correction.

When only extended quality information is declared:

In case the recommendation contents (4) are supported for user-A, and the recommendation contents (1) are supported for user-B, the connection setup request is discarded.

In case the recommendation contents (4) are supported for user-A, and the recommendation contents (2) are supported for user-B, the connection setup request is discarded.

In case the recommendation contents (4) are supported for user-A, and the recommendation contents (3) are supported for user-B, the connection setup request is discarded.

In case the recommendation contents (4) are supported for user-A, and the recommendation contents (4) are supported for user-B, the received QoS information is transmitted without correction.

Figure 4:
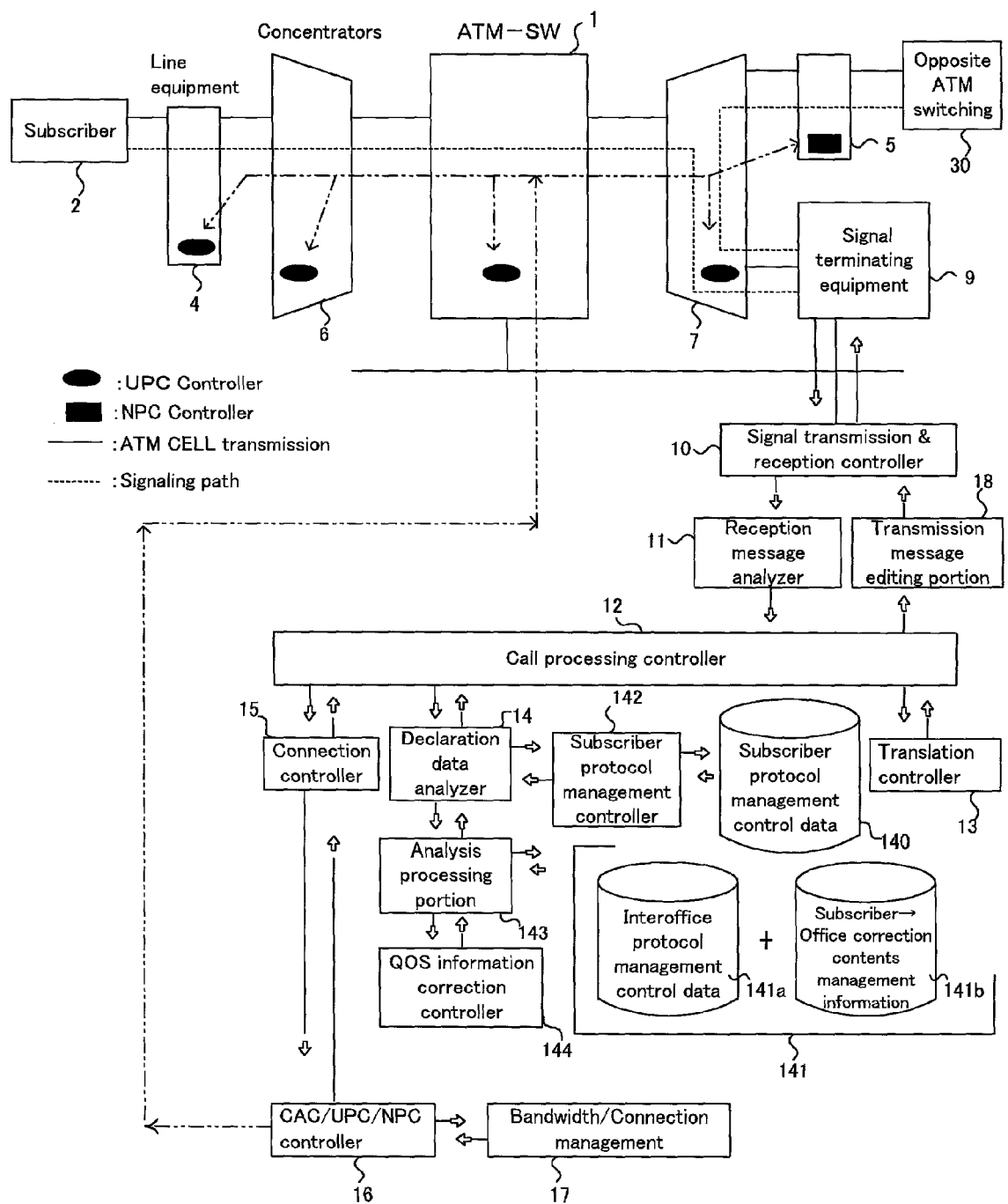
FIG. 4 shows a configuration example of the ATM switching according to the present invention, in which an originating subscriber transmits a signal to the ATM switching for establishing a connection from a subscriber to another subscriber, through the ATM switching and another ATM switching.

In FIG. 4, there is shown another embodiment of The ATM switching according to the present invention. In this figure, there is shown a connection setup in regard to Subscriber-ATM switch-ATM switch-Subscriber, more particularly, setup of connection when an originating subscriber transmits a signal to The ATM switching.

Figure 5:
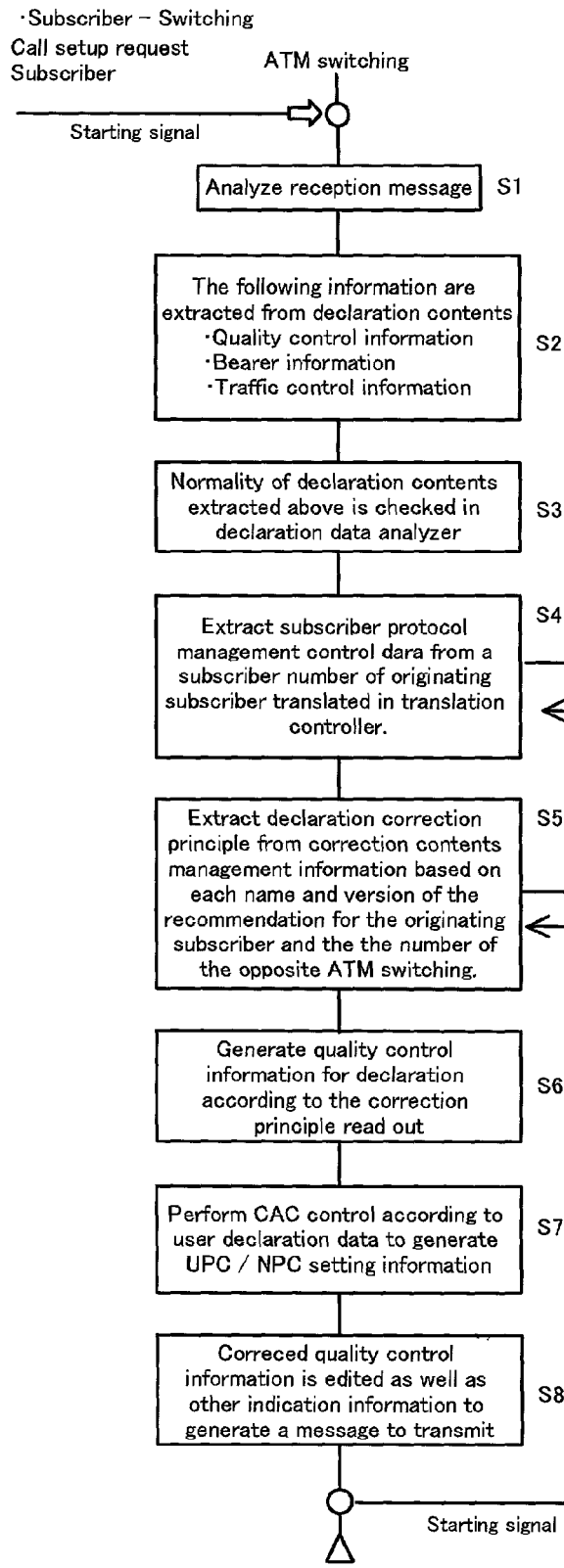
FIG. 5 shows an operation flowchart corresponding to FIG. 4.
Figure 5:
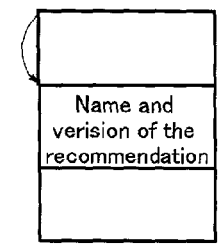
Figure 5:
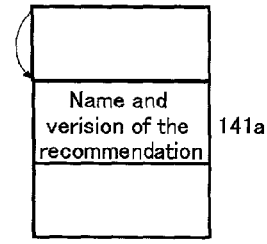
Figure 5:
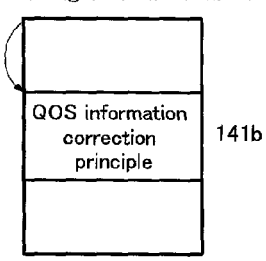

In FIG. 5, there is shown an operation flowchart which corresponds to FIG. 4. Compared to the embodiment shown in FIG. 2, there is provided interoffice protocol management control data 141*a* and subscriber-to-office correction contents management information 141*b*, respectively for correction contents management information 141.

In the operation flowchart in FIG. 5 corresponding to the embodiment shown in FIG. 4, the process identical to that shown in FIG. 3 is carried out, as to from a process when The ATM switching receives a call setup request from an originating subscriber 2, and then the received message is analyzed by reception message analyzer 11 (step S1), to a process of a decision in declaration data analyzer 14 (step S3).

Then, based on a subscriber number of originating subscriber 2 having been translated in translation controller 13, declaration data controller 14 extracts subscriber protocol management control data of the user from subscriber protocol management control data 140 through subscriber protocol management controller 142 (step S4).

Here, in subscriber protocol management control data 140, the name and version of the recommendation for supporting the corresponding users are registered based on subscriber numbers in main memory MM. This enables to read out the name and version of the recommendation for the originating subscriber.

Analysis processing portion 143 accesses interoffice protocol management control data 141*a* based on the number of the ATM switching opposite to the originating subscriber 2. Thus the recommendation and version for an opposite ATM switching is read out.

Further, based on both the recommendation and version read out by which the opposite ATM switching supports and the recommendation and version for the originating subscriber previously read out from subscriber protocol management control data 140, subscriber-to-office correction contents management information 141*b* is accessed to read out QoS information correction principle (step S5).

In main memory MM, interoffice protocol management control data 141*a* and subscriber-to-office correction contents management information 141*b* in the database of correction contents management information 141 are stored. Predetermined correction principle for correcting the differences of the recommendations and versions is registered for each combination of the recommendations and versions, respectively supported for an originating subscriber and the ATM switching accommodating the subscriber.

In QoS information correction controller 144, the operation flow identical to that shown in FIG. 3 is carried out, as to from a process for generating quality control information for declaration according to the read-out correction principle (step S6), to a process for editing as a transmission message a corrected quality control information to transmit to an terminated subscriber admitting the call setup request (step S8).

As mentioned above, also in the embodiment shown in FIG. 4, the difference of control level on quality control can be recognized from each version number of the recommendations. For each subscriber accommodated in the ATM switching, information on which version of the recommendation to which each subscriber's protocol conforms is stored in main memory MM as subscriber protocol management control data 140.

Further, corresponding to the combination of connections, the difference of the recommendations is stored in main memory MM as correction contents management information 141.

Figure 6:
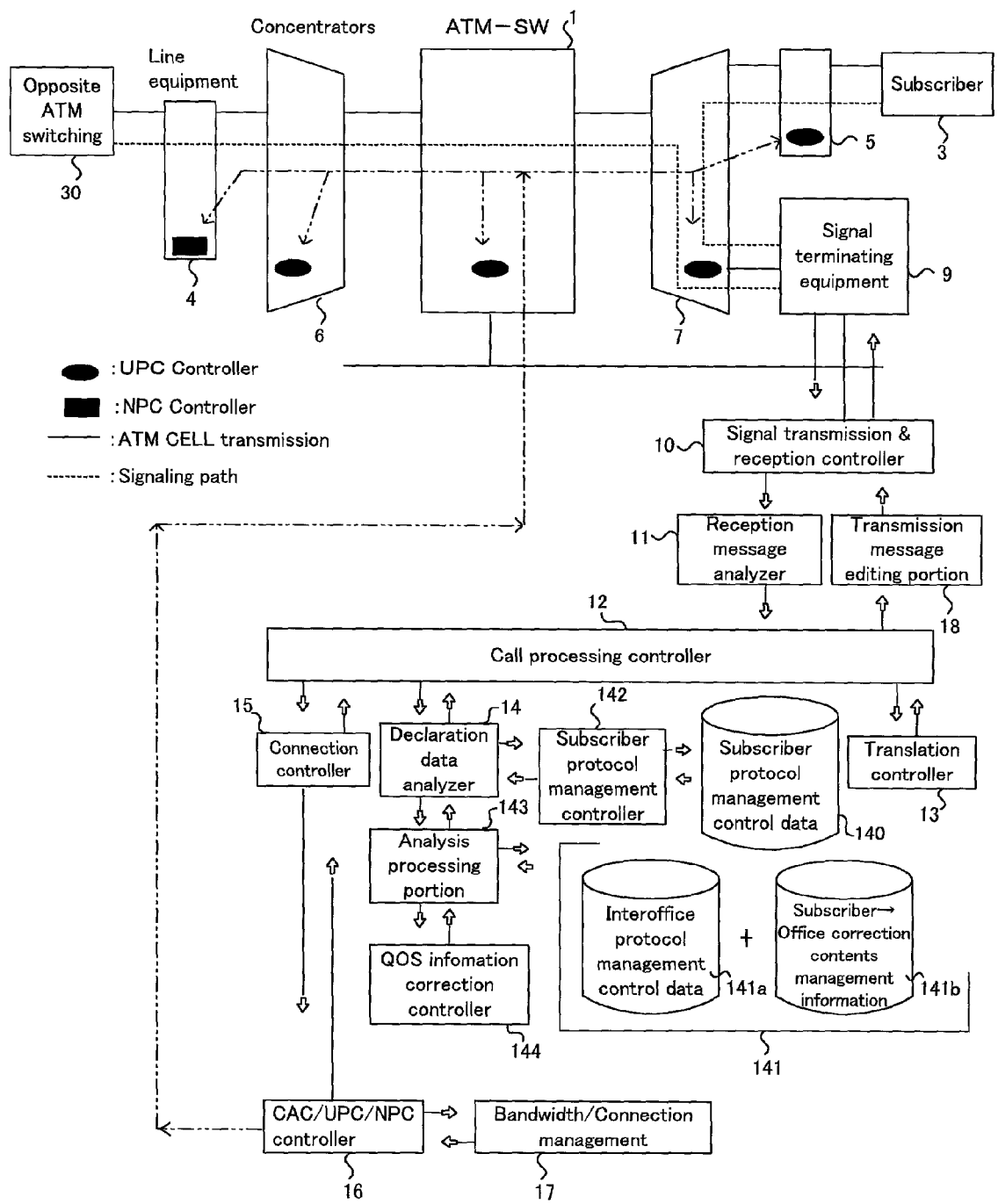
FIG. 6 shows a configuration example of the present invention, in which the ATM switching transmits a signal to a terminating subscriber for establishing a connection from a subscriber to another subscriber through the ATM switching and another ATM switching.

Now, in FIG. 6, there is shown a case of connection setup for Subscriber-ATM switch-ATM switch-Subscriber, particularly an example of connection setup in case the ATM switching 30 transmits signals to a terminating subscriber 3.

Figure 7:
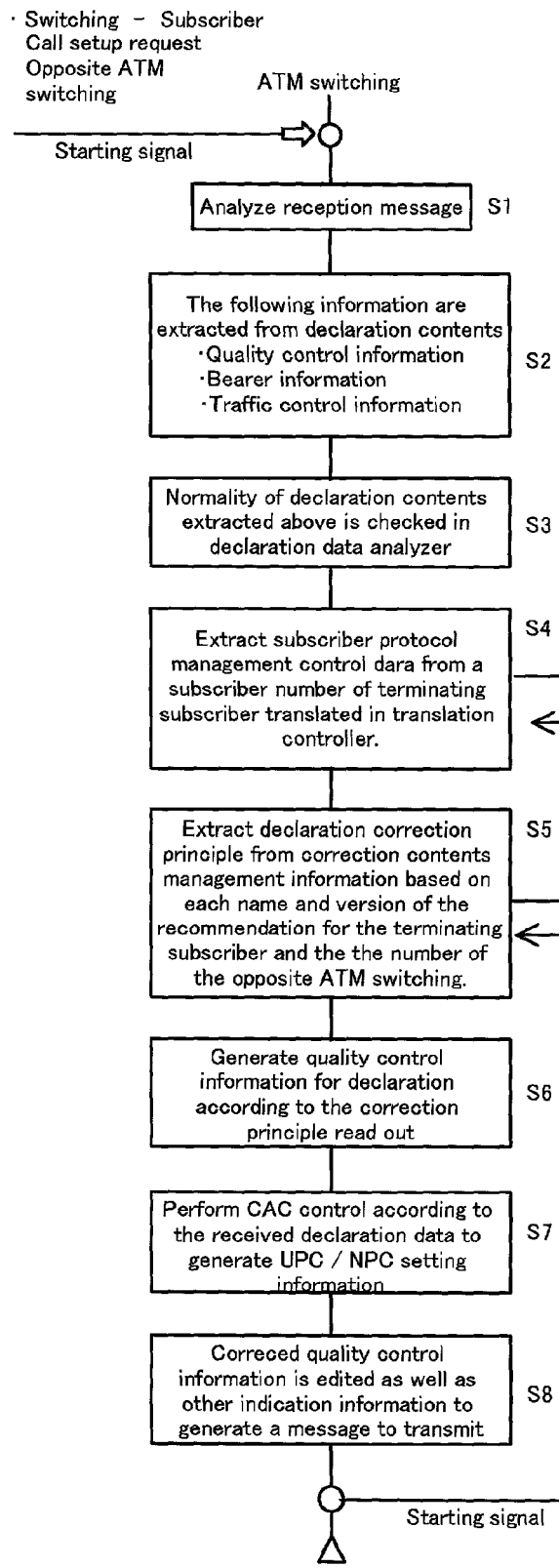
FIG. 7 shows an operation flowchart corresponding to FIG. 6.
Figure 7:
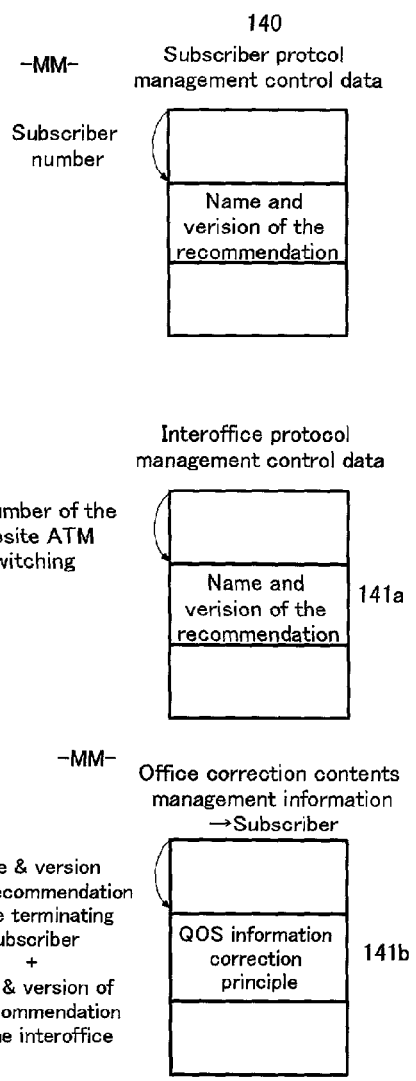

In FIG. 7, there is shown an operation flowchart corresponding to FIG. 6. The example shown in FIG. 6 is applied for the case that a protocol used for terminating subscriber 3 is different from a protocol used for the ATM switching.

Compared to the embodiment shown in FIG. 2, there is provided interoffice protocol management control data 141*a* and subscriber-to-office correction contents management information 141*b*, respectively for correction contents management information 141.

In the operation flowchart in FIG. 7 corresponding to the embodiment shown in FIG. 6, the process identical to that shown in FIG. 3 is carried out from a process when the ATM switching receives a call setup request from an originating subscriber 2, and then the received message is analyzed by reception message analyzer 11 (step S1), to a process of a decision in declaration data analyzer 14 (step S3).

Then, based on a subscriber number of terminating subscriber 3 having been translated in translation controller 13, declaration data controller 14 extracts subscriber protocol management control data of the user from subscriber protocol management control data 140 through subscriber protocol management controller 142 (step S4).

Here, in subscriber protocol management control data 140, the names and versions of the recommendations for supporting the corresponding users are registered in main memory MM on a per subscriber number basis. Using this data, reading out the name and version of the recommendation for the terminating subscriber is enabled.

Analysis processing portion 143 accesses interoffice protocol management control data 141a based on the ATM switching number opposite to the originating subscriber 2. Thus the recommendation and version for an opposite ATM switching is read out. Further, based on both the read out recommendation and version by which the opposite ATM switching supports and the recommendation and version for the originating subscriber previously read out from subscriber protocol management control data 140, subscriber-to-office correction contents management information 141b is accessed to read out QoS information correction principle (step S5).

In main memory MM, interoffice protocol management control data 141a and subscriber-to-office correction contents management information 141b in the database of correction contents management information 141 are stored. Predetermined correction principle for correcting the differences of the recommendations and versions is registered for each combination of the recommendations and versions respectively supported for an originating subscriber and the ATM switching accommodating the subscriber.

In QoS information correction controller 144, the operation flow identical to that shown in FIG. 3 is executed, as to from a process for generating quality control information for declaration according to the read-out correction principle (step S6), to a process for editing as a transmission message a corrected quality control information to transmit to an terminating subscriber which admits the call setup request (step S8).

As mentioned above, also in the embodiment shown in FIG. 6, the difference of control level on quality control can be known from each version of the recommendation. For each subscriber accommodated in the ATM switching, information on which version of the recommendation each subscriber's protocol conforms to is stored in main memory MM as subscriber protocol management control data 140.

Now, in order to solve the aforementioned problem (e), the control principle illustrated in FIG. 4 to FIG. 7 is adopted at the connection setup of Subscriber-ATM switch-ATM switch-Subscriber. By realizing this control principle, uniform quality can be achieved for a connection between end switch to end switch.

When a product designed by other manufacturer is used, the above principle can be applied by modifying control software to adjust inconsistency, in case the product conforms to the interoffice communication protocol which is included in the range of protocol series issued by the recommendation organization and used in the relevant public network.

More specifically, hereinafter there are shown contents of the latest versions of the recommendations adopted in the aforementioned market regions of North America, Europe, Asia and Middle and Near East. Uniform quality can be obtained by mapping subscriber signaling protocol into these recommendations.

(1) For North American Market

Figure 8:
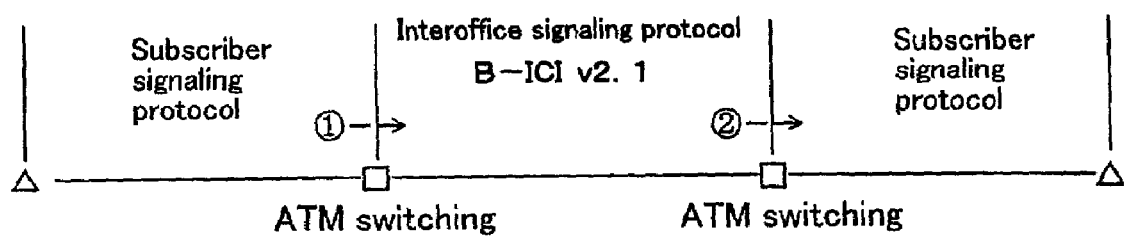
FIG. 8 shows an example in which the ATM forum B-ICI V2.1 protocol is applied as an interoffice communication protocol for 'end switch to end switch' communication in a public switched ATM network.

The ATM forum B-ICI V2.1 switching office communication protocol for end switch-to-end switch in an ATM switched public network as shown in FIG. 8 is considered.

As transit principle, the recommendation contents (4) explained before is applied for interoffice transit. As for subscriber protocols, the aforementioned recommendations (1), (2), (3) and (4) are applied.

The mapping is carried out according to the following quality information conversion principle:

① Declaration data in subscriber protocol corresponding to a subscriber signaling protocol supported for a subscriber requesting connection setup is mapped into a specification of interoffice signaling protocol. This conversion principle ① corresponds to the configuration shown in FIG. 4, and also corresponds to the conversion processing of the part ① in FIG. 8.

② Declaration data in interoffice signaling protocol is mapped according to the specification which corresponds to a subscriber signaling protocol supported for a terminating subscriber. This conversion principle ② corresponds to the configuration shown in FIG. 6, and also corresponds to the conversion processing in the part ② in FIG. 8, i.e. the point from the originating subscriber to the ATM switching.

Corresponding to FIG. 4, correction contents management information at the traffic point from the originating subscriber to the ATM switching shown in FIG. 8 (① in FIG. 8) is as follows:

In case an originating subscriber protocol is the recommendation contents (1), the interoffice signaling protocol B-ICI transmits the declared quality information without correction.

In case an originating subscriber protocol is the recommendation contents (2), if declared quality information QoS=0 to 3, the interoffice signaling protocol B-ICI transmits without correction. If QoS=4, then it is converted to QoS=0 and best-effort indication is generated and added, similar to the subscriber signaling protocol, to transmit. Accordingly, the declaration of traffic type UBR corresponding to Q0 S=4 in the recommendation contents (2) can be transmitted accurately.

In case an originating subscriber protocol is the recommendation contents (3), the interoffice signaling protocol B-ICI transmits declared quality information without correction.

In case an originating subscriber protocol is the recommendation contents (4), the interoffice signaling protocol B-ICI also transmits declared quality information without correction.

Further, corresponding to FIG. 6, correction contents management information at the traffic point from the ATM switching to a terminating subscriber shown in FIG. 8 (② in FIG. 8) is as follows:

In case a terminating subscriber protocol is the recommendation contents (1), any declared quality information is converted to QoS=0 to transmit. If there exists extended quality control information, this information is discarded. Further, if there exists only extended quality control information, the connection setup request is discarded.

In case a terminating subscriber protocol is the recommendation contents (2), and if declared quality information QoS=0 to 3, it is transmitted without correction. If QoS=0 and best-effort indication is added, then the QoS is converted to QoS=4 and best-effort indication is deleted to transmit.

Also, if QoS=4, it is converted to QoS=3 to transmit. If there exists extended quality control information, this information is discarded. Further, if there exists only extended quality control information, the connection setup request is discarded.

In case a terminating subscriber protocol is the recommendation contents (3), and if declared quality information QoS=0 to 3, it is transmitted without correction. If QoS=0 and best-effort indication is added, then it is transmitted without correction. Further if QoS=4, it is converted to QoS=3 to transmit. If there exists extended quality control information, this information is discarded. Further, if there exists only extended quality control information, the connection setup request is discarded.

In case a terminating subscriber protocol is the recommendation contents (4), declared quality information is transmitted without correction.

(2) For Europe, Asia and Middle and Near East markets

The ITI-T SCS2.2 switching office communication protocol for end switch to end switch in an ATM switched public network as shown in FIG. 8 is considered.

As transit principle, the recommendation contents (4) explained before is applied for interoffice transit. As for subscriber protocols, the aforementioned recommendations (1), (2), (3) and (4) are applied.

The mapping is carried out according to the following quality information conversion principle:

① Declaration data in a subscriber protocol corresponding to a subscriber signaling protocol supported for a subscriber requesting connection setup is mapped into a specification of interoffice signaling protocol. This conversion principle ① corresponds to the configuration shown in FIG. 4, and also corresponds to the conversion processing of the part ① in FIG. 9.

② Declaration data in interoffice signaling protocol is mapped according to the specification which corresponds to a subscriber signaling protocol supported for a terminating subscriber. This conversion principle ② corresponds to the configuration shown in FIG. 6, and also corresponds to the conversion processing in the part ② in FIG. 9.

The configurations of conversion processing of above ① and ② are as shown in FIG. 4 and FIG. 6.

Figure 9:
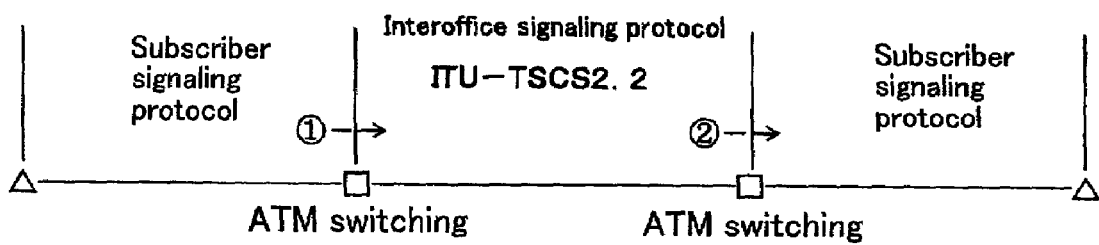
FIG. 9 shows another example in which the protocol of ITU-T SCS 2.2 is applied as an interoffice communication protocol for an end switch to another end switch in an ATM switched public network.

Corresponding to FIG. 4, correction contents management information at the traffic point from the originating subscriber to the ATM switching shown in FIG. 9 is as follows:

In case an originating subscriber protocol is the recommendation contents (1), the interoffice signaling protocol ITU-T SCS 2.2 transmits the declared quality information without correction.

In case an originating subscriber protocol is the recommendation contents (2), the interoffice signaling protocol ITU-T SCS2.2 transmits the declared quality information without correction.

In case an originating subscriber protocol is the recommendation contents (3), the interoffice signaling protocol ITU-T SCS2.2 transmits the declared quality information without correction. When declared traffic type=UBR and QoS=0, the QoS is converted to 4, and the best-effort indication having been added is discarded to transmit.

In case an originating subscriber protocol is the recommendation contents (4), the interoffice signaling protocol ITU-T SCS2.2 transmits the declared quality information without correction when QoS=0 to 3, except the following case. When declared traffic type=UBR and QOS=0, the QoS is converted to 4 and best-effort indication having been added is discarded to transmit. Also, when declared traffic type=ABR and QOS=0, the QoS is converted to 2. when QoS=4, it is converted to 2 to transmit.

If there exists extended quality control information, this information is discarded. Further, if there exists only extended quality control information, the connection setup request is discarded.

Further, corresponding to FIG. 6, correction contents management information at the traffic point from the ATM switching to a terminating subscriber shown in ② of FIG. 8 is as follows:

In case a terminating subscriber protocol is the recommendation contents (1), the interoffice signaling protocol ITU-T SCS2.2 converts any declared quality information to QoS=0 to transmit.

In case a terminating subscriber protocol is the recommendation contents (2), the interoffice signaling protocol ITU-T SCS2.2 transmits declared quality information without correction.

In case a terminating subscriber protocol is the recommendation contents (3), the interoffice signaling protocol ITU-T SCS2.2 transmits declared quality information without correction if QoS=0 to 3. If QoS=4, it is converted to 0 and best-effort indication is added to transmit.

In case a terminating subscriber protocol is the recommendation contents (4), the interoffice signaling protocol ITU-T SCS2.2 transmits declared quality information without correction if QoS=0 to 3. If QoS=4, it is converted to 0 and best-effort indication is added to transmit. When traffic type=ABR, QoS is converted to 0 to transmit.

INDUSTRIAL APPLICABILITY

The differences of quality control level applied in ATM switching system can be distinguished from the version numbers of the recommendations established by recommendation organizations. According to the present invention, it is managed that which versions of the recommendations the protocol for each subscriber accommodated in the ATM switching conforms to. By correcting the differences of the recommendations, such problems that connection setup request is rejected or interworking is impeded because of the difference of the recommendation versions can be eliminated.

What is claimed is:

1. A method for transmitting quality declaration data in an ATM switched network having an ATM switching system which accommodates an originating subscriber and a terminating subscriber, comprising the steps of:

determining, in said ATM switching system, quality of service (QoS) correction principle for correcting the difference between a subscriber signaling protocol supporting said originating subscriber and a subscriber signaling protocol supporting said terminating subscriber;

generating quality control information corrected using said QoS correction principle;

performing connection admission control and usage parameter control according to said generated quality control information; and transmitting said quality control information to said terminating subscriber.

2. The method for transmitting quality declaration data according to claim 1, wherein said QoS correction principle is derived from a plurality of combinations of an originating subscriber and a terminating subscriber in regard to said version of predetermined subscriber signaling protocols.

3. A method for transmitting quality declaration data in an ATM switched network having a first ATM switching system, an originating subscriber accommodated in said first ATM switching system, a second ATM switching system in which a connection is set up with said first ATM switching system through an interoffice signaling protocol, and a terminating subscriber accommodated in said second ATM switching system, said method for transmitting quality declaration data comprising the steps of:

converting declaration data in a subscriber signaling protocol corresponding to said subscriber signaling protocol for supporting said originating subscriber having requested connection setup, to a specification of said interoffice signaling protocol; and converting said declaration data in said interoffice signaling protocol to a specification corresponding to a subscriber signaling protocol for supporting said terminating subscriber.

4. An ATM switching system accommodating an ATM originating subscriber and an ATM terminating subscriber, comprising:

a subscriber signaling protocol database for storing subscriber signaling protocols respectively for supporting each subscriber corresponding to each subscriber number of said ATM originating subscriber and said ATM terminating subscriber;

a database of correction contents management information for storing quality of service (QoS) correction principle corresponding to a combination of subscriber signaling protocols for supporting said respective originating subscriber and terminating subscriber, respectively stored in said subscriber protocol database, and a means for generating quality control information corrected using said QoS correction principle, performing connection admission control and usage parameter control according to said generated quality control information, and transmitting said quality control information by ATM cells to said ATM terminating subscriber.

5. The ATM switching system according to claim 4, wherein said QoS correction principle is obtained from a plurality of combinations of an ATM originating subscriber and an ATM terminating subscriber in regard to predetermined versions of subscriber signaling protocols.

6. An ATM switching system comprising:

a first ATM switching system;

an originating subscriber accommodated in said first ATM switching system;

a second ATM switching system in which a connection is set up with said first ATM switching system through an interoffice signaling protocol; and a terminating subscriber accommodated in said second ATM switching system;

wherein said first ATM switching system converts declaration data in a subscriber signaling protocol corresponding to said subscriber signaling protocol for supporting said originating subscriber having requested, connection setup, to a specification of said interoffice signaling protocol, and said second ATM switching system converts said declaration data in said interoffice signaling protocol to a specification corresponding to a subscriber signaling protocol for supporting said terminating subscriber.

* * * * *